US012683525B2

(12) United States Patent
Hofmann et al.

(10) Patent No.: US 12,683,525 B2
(45) Date of Patent: Jul. 14, 2026

(54) METHOD FOR CONTROLLING AT LEAST ONE SERVOMOTOR IN A BRAKING MANNER, ROBOT, AND COMPUTER PROGRAM PRODUCT

(71) Applicant: KUKA Deutschland GmbH, Augsburg (DE)

(72) Inventors: Josef Hofmann, Wolferstadt (DE); Hartmut Keyl, Augsburg (DE)

(73) Assignee: KUKA Deutschland GmbH (DE)

( * ) Notice: Subject to any disclaimer, the term of this patent is extended or adjusted under 35 U.S.C. 154(b) by 603 days.

(21) Appl. No.: 17/778,575

(22) PCT Filed: Nov. 10, 2020

(86) PCT No.: PCT/EP2020/081584
§ 371 (c)(1),
(2) Date: May 20, 2022

(87) PCT Pub. No.: WO2021/099177
PCT Pub. Date: May 27, 2021

(65) Prior Publication Data
US 2022/0407438 A1     Dec. 22, 2022

(30) Foreign Application Priority Data
Nov. 21, 2019    (DE) ..................... 10 2019 217 957.6

(51) Int. Cl.
*H02P 3/14*        (2006.01)
*B25J 9/16*        (2006.01)

(52) U.S. Cl.
CPC .............. *H02P 3/14* (2013.01); *B25J 9/1633* (2013.01)

(58) Field of Classification Search
CPC .................................. B25J 9/1633; H02P 3/14
(Continued)

(56) References Cited

U.S. PATENT DOCUMENTS

| | | | | |
|---|---|---|---|---|
| 8,736,219 | B2 * | 5/2014 | Hofmann | B25J 19/06 |
| | | | | 363/35 |
| 2014/0210389 | A1 * | 7/2014 | Niwa | H02P 3/22 |
| | | | | 318/400.3 |
| 2019/0195962 | A1 * | 6/2019 | Mustonen | G01R 31/42 |

FOREIGN PATENT DOCUMENTS

| | | |
|---|---|---|
| CN | 105229918 A | 1/2016 |
| DE | 102016203701 A1 | 9/2017 |

(Continued)

OTHER PUBLICATIONS

Twellsieck et al. (DE 102016208888 A1) Device For Reducing A Voltage Applied To A Circuit (Year: 2017).*

(Continued)

*Primary Examiner* — Jorge L Carrasquillo
(74) *Attorney, Agent, or Firm* — Dorton & Willis, LLP

(57) ABSTRACT

A method for controlling at least one servomotor in a braking manner with a frequency converter includes disconnecting a direct-voltage intermediate circuit from an electric alternating-voltage network, braking the servomotor by controlling semiconductor switches of an inverter circuit in a regenerative braking mode in order to reduce the speed of the servomotor, and controlling a brake chopper such that a brake resistor is switched on at a maximum intermediate-circuit voltage, which forms a switch-on threshold for the brake chopper, and is disconnected at a minimum intermediate-circuit voltage, which forms a switch-off threshold for the brake chopper. The switch-on threshold and/or the switch-off threshold are dynamically changed during regenerative braking of the servomotor as a function of the current speed of the servomotor.

11 Claims, 4 Drawing Sheets

(58) Field of Classification Search
USPC ........................................................ 318/376
See application file for complete search history.

(56) References Cited

FOREIGN PATENT DOCUMENTS

| | | | |
|------|----------------|----|---------|
| DE | 102016208888 | A1 | 11/2017 |
| DE | 102007059492 | B4 | 6/2018 |
| EP | 2224586 | A1 | 9/2010 |
| KR | 1020100096203 | A | 9/2010 |

OTHER PUBLICATIONS

Jobard (KR 20090024654 A)Safety Device for Detecting Inadequate Electric Braking and Commutation To a Safety Brake (Year: 2009).*

European Patent Office; Search Report in related International Patent Application No. PCT/EP2020/081584 dated Jan. 20, 2021; 3 pages.

Korean Patent Office; Office Action in related Korean Patent Application No. 10-2022-7020026 dated Mar. 18, 2025; 9 pages.

Chinese Patent Office; Office Action in related Chinese Patent Application No. 2020800812722; dated Jun. 26, 2025; 9 pages.

* cited by examiner

METHOD FOR CONTROLLING AT LEAST ONE SERVOMOTOR IN A BRAKING MANNER, ROBOT, AND COMPUTER PROGRAM PRODUCT

CROSS-REFERENCE TO RELATED APPLICATIONS

This application is a national phase application under 35 U.S.C. § 371 of International Patent Application No. PCT/EP2020/081584, filed Nov. 10, 2020 (pending), which claims the benefit of priority to German Patent Application No. DE 10 2019 217 957.6, filed Nov. 21, 2019, the disclosures of which are incorporated by reference herein in their entirety.

TECHNICAL FIELD

The invention relates to a method for controlling at least one servomotor in a braking manner by means of a frequency converter which comprises a rectifier circuit connectable to an electric alternating-voltage network, a direct-voltage intermediate circuit, which is fed from the electric alternating-voltage network in the state connected to the electric alternating-voltage network and has an intermediate-circuit capacitor and has a brake resistor, which can be connected and disconnected via a brake chopper of the direct-voltage intermediate circuit, and at least one inverter circuit, which is fed from the direct-voltage intermediate circuit and has controllable semiconductor switches. The invention also relates to a correspondingly designed robot and an associated computer program product.

BACKGROUND

EP 2 224 586 A1 discloses a method for controlling a motor-driven industrial robot comprising at least one drive motor fed by a supply circuit connectable to the mains voltage, which comprises at least one rectifier circuit connectable to the mains voltage, an intermediate circuit with at least one intermediate-circuit capacitor, and a bridge switch device connected to the drive motor on the output side, which provides an alternating or direct power supply for the drive motor, the power supply circuit of the drive motor being controlled by a control device for accelerating and braking the drive motor. The method therein for electrically braking the drive motor comprises the steps of disconnecting the intermediate circuit from the mains and regulating the intermediate-circuit voltage to a predetermined value greater than zero, the intermediate-circuit capacitor being fed when the drive motor operates regeneratively.

DE 10 2007 059 492 B4 discloses industrial robots, comprising a robot arm which has a plurality of axes and at least one electric drive with a three-phase motor and with power electronics that control the three-phase motor, the power electronics having a three-phase inverter driving the three-phase motor and an intermediate circuit which comprises an intermediate-circuit capacitator and is connected upstream of the three-phase inverter and comprises a first brake resistor and a first switch, wherein the electric drive is configured to move the relevant axis, with the industrial robot being configured to short-circuit the three-phase motor simultaneously by means of two mutually independent electrical current paths during emergency braking and to close the first switch during emergency braking in order to connect the brake resistor in parallel with the intermediate-circuit capacitor, so that one of the two electrical current paths for emergency braking runs through the first brake resistor.

SUMMARY

The object of the invention is to provide a method for controlling at least one servomotor in a braking manner, which works particularly effectively and safely.

The object is achieved by a method for controlling at least one servomotor in a braking manner by means of a frequency converter which comprises a rectifier circuit connectable to an electric alternating-voltage network, a direct-voltage intermediate circuit, which is fed from the electric alternating-voltage network in the state connected to the electric alternating-voltage network and has an intermediate-circuit capacitor and has a brake resistor, which can be connected and disconnected via a brake chopper of the direct-voltage intermediate circuit, and at least one inverter circuit, which is fed from the direct-voltage intermediate circuit and has controllable semiconductor switches, comprising the following steps:

Disconnecting the direct-voltage intermediate circuit from the electric alternating-voltage network, Braking the servomotor by controlling the semiconductor switches of the inverter circuit in a regenerative braking mode in order to reduce the speed of the servomotor, Controlling the brake chopper in such a way that the brake resistor is switched on at a maximum intermediate-circuit voltage, which forms a switch-on threshold for the brake chopper, and is disconnected at a minimum intermediate-circuit voltage, which forms a switch-off threshold for the brake chopper, wherein The switch-on threshold and/or the switch-off threshold are dynamically changed during regenerative braking of the servomotor as a function of the current speed of the servomotor.

In principle, the method according to the invention can be carried out by controlling a single servomotor. However, the method according to the invention can be carried out in particular by controlling at least two servomotors. In the special embodiment of the control of drives of a robot arm, the inventive method can be carried out, for example, by controlling six or seven servomotors, which form the drives of a robot arm.

Inventively, controlling in a braking manner means that while the method is being carried out, one or more servomotors are neither braked by mechanical brakes, (electro) mechanical brakes, nor by short-circuit braking, but are braked while the method is being carried out exclusively in a regenerative operation of the one or more servomotors, which regenerative operation is actively controlled in the inverter circuit. In such an actively controlled regenerative operation of one or more servomotors, electrical energy is fed via the inverter circuit to the direct-voltage intermediate circuit or energy is exchanged, so that by switching the semiconductor switches of the inverter circuit on and off, corresponding alternating currents can be introduced into the windings of one or more servomotors, which generate magnetic fields that cause braking mechanical forces on the servomotor shaft or shafts. Braking means reducing the speed of the respective servomotor shaft. Braking does not necessarily have to be carried out until the corresponding servomotor shaft has come to a complete standstill. Rather, braking can only be carried out from a higher first speed to a lower second speed, which is lower than the first speed.

In the case of two or more servomotors, which are controlled in a braking manner according to one of the inventive methods, it is not necessary for all the servomotors to be controlled in a braking manner at the same time. Instead, at any time, a first subgroup of a subset of servomotors can be selectively controlled in a braking manner and a second subgroup of another subset of servomotors can be driven stationary at a constant velocity, i.e. driven in an idle state or even accelerated. In a special state, only a single servomotor can be controlled in a regenerative braking manner and the other servomotors cannot be controlled in a regenerative braking manner. In a particular state, all of the servomotors can be controlled in a regenerative braking manner at the same time.

The position (the motor position, i.e. the current angular position of the motor shaft), speed, acceleration and/or braking behavior (negative acceleration) of the at least one servomotor is controlled electrically by means of the inventive frequency converter. In the case of two or more servomotors, the frequency converter comprises a number of inverter circuits corresponding to the number of servomotors. The plurality of inverter circuits is connected to a common direct-voltage intermediate circuit. The common direct-voltage intermediate circuit is fed by a common rectifier circuit from the same electric alternating-voltage network when the frequency converter is connected to the electric alternating-voltage network. However, during the inventive method for controlling in a braking manner, the frequency converter, in particular the common rectifier circuit, is temporarily disconnected from the electric alternating-voltage network. This means that in the case of two or more servomotors in a state in which none of the servomotors are controlled in a braking manner, the frequency converter is reconnected to the electric alternating-voltage network.

The electric alternating-voltage network provides electrical energy from an energy network of an energy supplier. In general, this will be a low-voltage network. The low-voltage grid can in particular be a three-phase alternating-voltage network. The three-phase alternating-voltage network supplies a sinusoidal alternating supply voltage. This sinusoidal alternating supply voltage can in particular comprise an effective value at which a voltage of, for example, 230 volts is present between an outer conductor of the three-phase alternating-voltage network and a neutral conductor of the three-phase alternating-voltage network and a voltage of, for example, 400 volts is present between any two of the three outer conductors. The network frequency can be 50 Hertz or 60 Hertz, for example. In particular, the three-phase alternating-voltage network can be configured as a TN system comprising three external conductors (L1, L2, L3), a neutral conductor (N) and a protective conductor (PE).

The rectifier circuit of the frequency converter can be a three-phase rectifier, for example. The three-phase rectifier can be implemented in the form of an uncontrolled three-phase bridge.

The direct-voltage intermediate circuit is fed with electrical energy from the electric alternating-voltage network when the frequency converter is connected to the electric alternating-voltage network. If the direct-voltage intermediate circuit is disconnected from the electric alternating-voltage network, as is the case during operating times when the inventive method is carried out, the direct-voltage intermediate circuit is fed exclusively by electrical energy from the inverter circuit, which can feed electrical energy when the at least one servomotor is operated regeneratively.

During the operating times in which the inventive method is being carried out, electrical energy can also be released from the intermediate-circuit capacitor, specifically either to the inverter circuit or to the brake resistor.

The brake resistor is designed to draw electrical energy from the direct-voltage intermediate circuit and to convert it into heat when it is connected to the direct-voltage intermediate circuit. When it is disconnected from the direct-voltage intermediate circuit, the brake resistor has no electrical effect on the direct-voltage intermediate circuit, i.e. the direct-voltage intermediate circuit remains unaffected by the brake resistor when the brake resistor is disconnected.

The brake chopper, via which the brake resistor is connected to and/or disconnected from the direct-voltage intermediate circuit, is a controllable switch. To this extent, the brake chopper can be operated in a pulse-width-controlled manner.

The inverter circuit fed from the direct-voltage intermediate circuit comprises semiconductor switches that can be controlled electronically, for example by associated driver circuits. The inverter circuit can be a three-phase inverter and can be designed, for example, as a two-stage inverter (U-inverter) or a pulse-controlled inverter. In the inverter circuit, the semiconductor switches carry the electrical energy to the servomotor when the current and voltage have the same sign. The electrical energy thus flows out of the direct-voltage intermediate circuit and into the servomotor. In regenerative operation, the freewheeling diodes assigned to the semiconductor switches inventively do not dissipate the electrical energy in order to return regenerative energy from the servomotor or servomotors to the direct-voltage intermediate circuit, i.e. to the intermediate-circuit capacitor, but rather the semiconductor switches remain active and are controlled in accordance with driver circuits assigned to the semiconductor switches in order to draw electrical energy from the servomotors and feed it into the direct-voltage intermediate circuit, i.e. into the intermediate-circuit capacitor.

In the inventive method, the direct-voltage intermediate circuit is first disconnected from the electric alternating-voltage network. This is, for example, in the event of an emergency shutdown of the respective machine that is driven by the at least one servomotor, at least expediently or even absolutely necessary with regard to certain safety requirements to be observed.

For example, in the case of industrial robots in the event of a Category 0 emergency stop (e.g. according to the EN 60204 standard), an immediate interruption of the electrical energy supply is prescribed, in particular if, for example, mechanical disconnection, i.e. decoupling in the drive train and/or mechanical braking alone, is not possible.

On the other hand, a machine, such as the example of an industrial robot, can comprise system states in which a controlled speed reduction of the servomotors, in particular down to a standstill at zero speed, takes place more quickly than by mere mechanical braking, in which the servomotors are not controlled in their speeds.

In the inventive method, the at least one servomotor is therefore braked by actively controlling the semiconductor switches of the inverter circuit in a regenerative braking mode in order to reduce the speed of the servomotor in a controlled manner.

However, since the frequency converter is disconnected from the electric alternating-voltage network in the affected situation, it is inventively ensured that on the one hand enough electrical energy remains available in the direct-voltage intermediate circuit that is sufficient to operate the inverter circuit, but on the other hand the amount of energy in the direct-voltage is reduced to a possible minimum, so that an unwanted, possibly faulty restart of the at least one servomotor can be at least largely or even completely prevented. In this way, the function of a safely switched off torque (STO, Safe Torque Off) can also be implemented.

Inventively, this is achieved by controlling the brake chopper in such a way that the brake resistor is switched on at a maximum intermediate-circuit voltage, which forms a switch-on threshold for the brake chopper, and is disconnected at a minimum intermediate-circuit voltage, which forms a switch-off threshold for the brake chopper. At the same time, the switch-on threshold and/or the switch-off threshold are dynamically changed during the regenerative braking operation of the servomotor as a function of the current speed of the servomotor. By dynamically changing the switch-on threshold and/or switch-off threshold, the amount of electrical energy to be stored in the direct-voltage intermediate circuit can be dynamically adapted to the currently required conditions with regard to both target variables, namely with regard to a sufficiently high amount of energy to be able to supply the inverter circuit with electrical energy so that the servomotor can be operated regeneratively, i.e. it can be braked, and with regard to the lowest possible amount of energy in order to take enough energy from the system so that a possibly dangerous, unintentional restart of the servomotor is reliably prevented.

In contrast to the prior art, according to which it is known to merely regulate the intermediate-circuit voltage present at the intermediate-circuit capacitor to a predetermined desired value, such a desired value is inventively not predetermined, but rather the switch-on threshold and/or the switch-off threshold of the brake chopper are changed dynamically during regenerative operation of the at least one servomotor.

In a special embodiment, the switch-on threshold and/or the switch-off threshold are dynamically changed during regenerative braking of the servomotor as a function of the current speed of the servomotor such that the intermediate-circuit voltage is continuously reduced as the speed of the servomotor decreases.

In the case of more than a single servomotor, the intermediate-circuit voltage can be continuously reduced as the speed of that servomotor decreases, which is currently inducing the highest voltage in its regenerative operation. In the course of carrying out an inventive method, i.e. during the duration of a braking process, the referenced servomotor can change as a function of which the intermediate-circuit voltage is continuously reduced with its decreasing speed. So if the servomotor, as a function of which the intermediate-circuit voltage has been reduced so far, has come to a standstill or its current speed is at least reduced to such an extent that another servomotor has a higher speed, i.e. consequently induces a higher voltage in the intermediate-circuit voltage, the intermediate-circuit voltage can be switched to this other servomotor, so to speak, so that this other servomotor forms the new control variable for controlling the intermediate-circuit voltage.

The speed of the servomotor may be determined based on a current speed of the servomotor measured by a motor position sensor. For this purpose, the current speed of the servomotor can be determined, i.e. calculated, from two detected angular positions of the servomotor shaft at two different points in time.

As an alternative to measuring the speed of the servomotor using a motor position sensor or in addition to measuring the speed of the servomotor using a motor position sensor, for example to create a redundant, in particular diverse evaluation, the speed of the servomotor can be determined on the basis of the measured motor voltage of the servomotor currently prevailing in the servomotor. For this purpose, the current speed of the servomotor can be read from the characteristic curve on the basis of a fixed characteristic curve of the servomotor as a result of the type of construction via the current measured motor voltage.

The reduction in the intermediate-circuit voltage can in particular be carried out in proportion to the decrease in the speed of the servomotor. The reduction in the intermediate-circuit voltage can in particular be carried out synchronously with the decrease in the speed of the servomotor.

As the speed of the servomotor decreases, the kinetic energy of the kinematic system coupled to the servomotor, such as a gearbox connected to the motor shaft of the servomotor, link of the robot arm and/or a distal sub-chain of links and joints of the robot arm, is reduced. As a result, due to the reduced kinetic energy, only less braking energy is required to brake the coupled kinematic system in order to be able to bring the kinematic system, which is still moving at a slower rate, to a standstill. In the ideal case, the electrical energy in the intermediate circuit is completely or at least to a large extent removed at the moment when the kinematic system coupled to the servomotor comes to a standstill. This then results in a further advantage, namely that an unintended restart of the servomotor, i.e. possibly caused by an error, is no longer possible because there is not enough electrical energy in the intermediate circuit to be able to start the servomotor.

In a particular development, the switch-on threshold and/or the switch-off threshold can be changed during regenerative braking of the servomotor as a function of the current speed of the servomotor in such a way that the switch-on threshold and/or the switch-off threshold are changed on the basis of a current speed of the servomotor measured by a motor position sensor or on the basis of the measured motor voltage of the servomotor currently prevailing in the servomotor.

In a first embodiment variant, the switch-on threshold and/or the switch-off threshold can be changed on the basis of a current speed of the servomotor measured by a motor position sensor. The motor position sensor is used to record the current angular position of the motor shaft of the servomotor. The motor position sensor is also referred to as a rotary encoder. The rotational velocity and/or the rotational acceleration of the motor shaft of the servomotor can also be derived from two angular positions of rotation of the motor shaft of the servomotor detected at different points in time and can be determined in this respect. For example, a resolver, an incremental encoder, but also an absolute value encoder can be used as a motor position sensor.

In a second embodiment variant, however, the switch-on threshold and/or the switch-off threshold can also be changed on the basis of the measured motor voltage of the servomotor currently prevailing in the servomotor. In servomotors, the motor voltage, i.e. the electrical voltage in the windings, is known to be proportional to the speed of the motor shaft of the servomotor. In this respect, the motor voltage of the servomotor can be picked up electrically directly from the circuit to which the inverter circuit of the inventive frequency converter is connected. Consequently, no separate sensor components are necessary in this second embodiment variant.

The switch-on threshold and/or the switch-off threshold can be lowered to a predetermined minimum threshold value during regenerative braking of the servomotor as a function of the current speed of the servomotor, in particular the switch-off threshold value can be lowered to a minimum threshold value which is below the network voltage of the alternating-voltage network.

In very general terms, the switch-on threshold and the switch-off threshold define a two-point controller with hysteresis such that when the switch-on threshold is exceeded, coming from a lower voltage, the brake chopper connects the brake resistor to the direct-voltage intermediate circuit, so that electrical energy is converted into heat in the brake resistor and the intermediate-circuit voltage drops. However, if the voltage drops coming from the higher voltage, the voltage in the direct-voltage intermediate circuit must continue to drop beyond the turn-on threshold until it drops below the turn-off threshold voltage. In this respect, the switch-off threshold is always below the switch-on threshold, namely by a voltage difference which determines the hysteresis. When the voltage falls below the switch-off threshold, coming from a higher voltage, the brake chopper disconnects the brake resistor from the direct-voltage intermediate circuit again, so that the intermediate-circuit voltage in the direct-voltage intermediate circuit can rise again.

By lowering the minimum threshold value to a voltage value that is below the network voltage of the alternating-voltage network, the intermediate-circuit voltage can be lowered to the maximum, which allows the regenerative power to be maximized, so that the servomotor or servomotors can be braked with maximum regenerative energy.

The minimum threshold could thus be lowered to zero. However, depending on the type of control, it can be provided that the drivers of the inverter circuit, i.e. the semiconductor switches of the inverter circuit, are also supplied with electrical energy from the direct-voltage intermediate circuit of the frequency converter. In this case, lowering the minimum threshold down to zero volts is not expedient.

In a special embodiment, the switch-on threshold and/or the switch-off threshold can therefore be lowered during regenerative braking of the servomotor, as a function of the current speed of the servomotor, only to a minimum threshold value at which a minimum voltage is present in the direct-voltage intermediate circuit at which regenerative braking of the servomotor is still ensured by controlling the semiconductor switches of the inverter circuit. This minimum threshold value can be between zero and the network voltage of the alternating-voltage network, for example.

For the simultaneous control of at least two servomotors, the frequency converter can comprise a number of inverter circuits corresponding to the number of servomotors, which are connected to the common direct-voltage intermediate circuit of the frequency converter, the switch-on threshold and/or the switch-off threshold being dynamically changed during regenerative braking of one or more of the at least two servomotors as a function of the current speed of that servomotor that is currently inducing the highest intermediate-circuit voltage.

In the application of an exemplary robot arm, the robot arm can comprise a plurality of joints and a plurality of links which can be adjusted relative to one another by the movements of the joints of the robot arm. Each joint can be assigned its own servomotor. Each of the plurality of servomotors is designed to adjust the joint of the robot arm assigned thereto, specifically by automatically controlling the servomotor. For this purpose, the robot arm can comprise a control device which is designed to automatically control the servomotors of the robot arm in order to automatically adjust the links of the robot arm in relation to one another by moving the joints in a driven manner.

Each joint and thus each servomotor assigned to this respective joint moves a kinematic system which is formed by the distal kinematic subsystem upstream of this servomotor in the kinematic chain of the robot arm. In general, the servomotors arranged more proximally in the kinematic chain (servomotors of the basic axes of the robot arm) have to brake more kinetic energy than the servomotors arranged more distally (servomotors of the hand axes of the robot arm). However, at any given time, depending on the pose of the robot arm's joints, another servomotor may be loaded with the momentarily highest braking load. For example, a situation may arise where a base joint moving upward against gravity is to be braked and thus the braking force is largely provided by gravity and the associated servomotor is therefore not subjected to any particular electrical braking load. On the other hand, a rather light wrist of the robot arm can move in the direction of gravity, so that when braking, the acting gravitational acceleration must also be counteracted by the servomotor and this servomotor, which is assigned to the lighter wrist, is therefore subjected to a particularly high electrical braking load.

In the course of carrying out an inventive method, i.e. during the duration of a braking process, the referenced servomotor can therefore change, as a function of which the intermediate-circuit voltage is continuously reduced with its decreasing speed. So if the servomotor, as a function of which the intermediate-circuit voltage has been reduced so far, has come to a standstill or its current speed is at least reduced to such an extent that another servomotor has a higher speed, i.e. consequently induces a higher voltage in the intermediate-circuit voltage, the intermediate-circuit voltage can be switched to this other servomotor, so to speak, so that this other servomotor forms the new control variable for controlling the intermediate-circuit voltage.

In all design variants according to the invention, the electrical energy in the direct-voltage intermediate circuit can be increased during the dynamic change in the switch-on threshold and/or the switch-off threshold during regenerative braking of the servomotor in those states of the direct-voltage intermediate circuit in which the brake chopper has disconnected the brake resistor, by the intermediate-circuit capacitor being fed exclusively by the energy generated by the at least one servomotor from the inverter circuit.

The at least one servomotor can specifically be a permanent-magnet synchronous machine.

The inventive object is also achieved by a robot comprising a robot arm with a plurality of joints and a plurality of links which can be adjusted relative to one another by the movements of the joints of the robot arm, with at least one of the joints being assigned a servomotor which is designed to adjust the at least one joint, namely by automatically controlling the servomotor, and having a control device which is designed to automatically control at least one servomotor of the robot arm in order to automatically adjust the links of the robot arm in relation to one another by moving the joints in a driven manner, the control device being designed and configured to carry out a method according to one of the described embodiments.

The control device can be designed as part of a robot controller. Alternatively, however, the control device can also be designed as a separate control unit that interacts with the robot controller, for example by means of a communication link. The control device is designed, in particular, to control a frequency converter, which switches on a rectifier circuit that can be connected to an electric alternating-voltage network, a direct-voltage intermediate circuit which is fed from the electric alternating-voltage network in the state connected to the electric alternating-voltage network and has an intermediate-circuit capacitor and has a brake resistor, which can be connected and disconnected via a brake chopper of the direct-voltage intermediate circuit, and at least one inverter circuit, which is fed from the direct-voltage intermediate circuit and has controllable semiconductor switches.

The object of the invention is also achieved by a computer program product comprising a machine-readable carrier on which a program code is stored, which can be read by a control device of the inventive robot and which, when read, forms and/or configures the control device to carry out a method according to one of the described embodiments if the program code is executed by the control device.

The computer program product can be a CD, a DVD or a USB stick, for example. However, the computer program product can also be a control card on which microprocessors are integrated. However, the computer program product can also be implemented in the form of a download that can be offered and sold over the Internet or another network.

The machine-readable carrier can thus be a CD, a DVD or a microprocessor on which the program code is stored. However, the machine-readable carrier can also be a hard disk or an SSD drive onto which the program code has been downloaded, for example by means of a download, in particular in the form of data packets.

The program code may be represented by an edited program and/or data stored on the machine-readable carrier.

By reading the edited program and/or the data, the reading control device is designed and/or configured to be able to carry out the inventive method.

The inventive method is carried out when the control device actually executes the program code, i.e. the edited program, and/or actually processes the data accordingly.

Specific embodiments of the invention are explained in more detail in the following descriptions with reference to the accompanying figures. Specific features of these embodiments, possibly considered individually or in further combinations, can represent general features of the invention regardless of the specific context in which they are mentioned.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
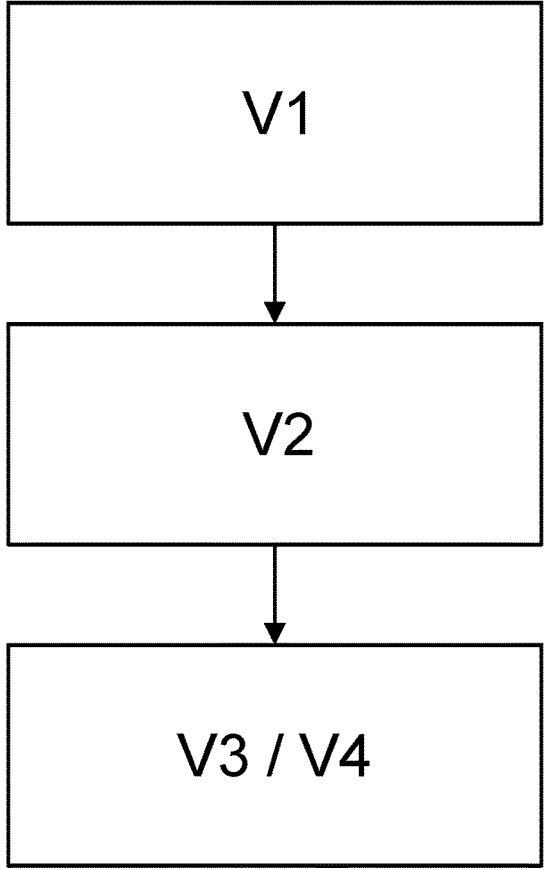
FIG. 1 is a flowchart of the inventive method.

In FIG. 1, the sequence of the basic inventive method for controlling at least one servomotor M in a braking manner by means of a frequency converter 1 (FIG. 3, FIG. 4) is shown schematically.

Figure 3:
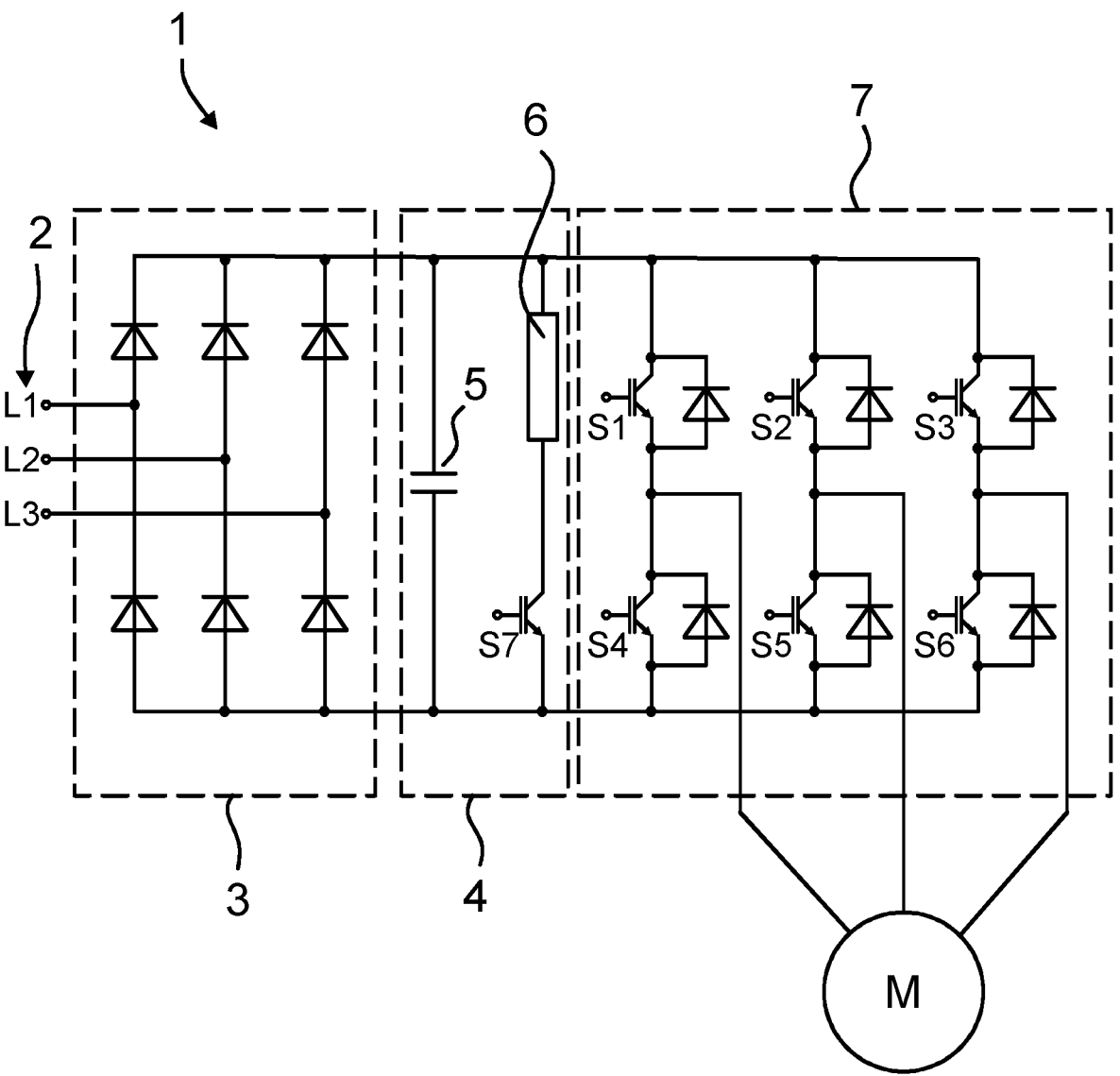
FIG. 3 is a schematic representation of a circuit diagram of an exemplary frequency converter with a servomotor.
Figure 4:
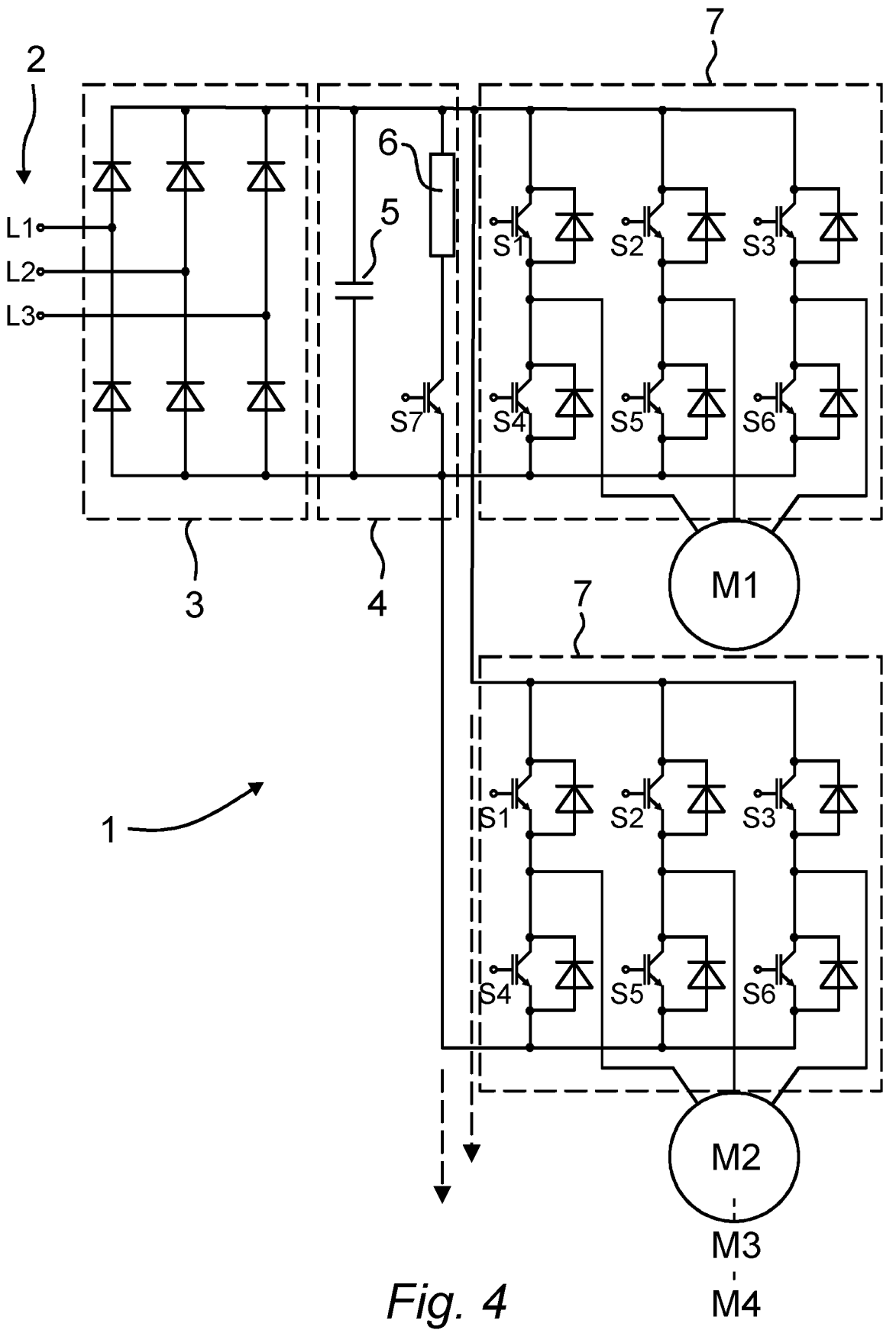
FIG. 4 is a schematic representation of a circuit diagram of an exemplary modified frequency converter with two or more servomotors that are connected to a common direct-voltage intermediate circuit.

As shown in FIGS. 3 and 4, the frequency converter 1 can comprise a rectifier circuit 3 connectable to an electric alternating-voltage network 2, a direct-voltage intermediate circuit 4, which is fed from the electric alternating-voltage network 2 in the state connected to the electric alternating-voltage network 2 and has an intermediate-circuit capacitor 5 and has a brake resistor 6, which can be connected and disconnected via a brake chopper S70 of the direct-voltage intermediate circuit 4, and at least one inverter circuit 7, which is fed from the direct-voltage intermediate circuit 4 and has controllable semiconductor switches S1 to S6.

The inventive method, as shown in FIG. 1, comprises the following steps:

In the first step VI, the direct-voltage intermediate circuit 4 is disconnected from the electric alternating-voltage network 2.

In a subsequent second step V2, the servomotor M is braked by controlling the semiconductor switches S1-S6 of the inverter circuit 7 in a regenerative braking mode in order to reduce the speed of the servomotor M.

In a third step V3, the brake chopper S7 is controlled in such a way that the brake resistor 6 is switched on at a maximum intermediate-circuit voltage, which forms a switch-on threshold for the brake chopper S7, and is disconnected at a minimum intermediate-circuit voltage, which forms a switch-off threshold for the brake chopper S7, wherein, according to step V4, the switch-on threshold and/or the switch-off threshold are dynamically changed during regenerative braking of the servomotor M as a function of the current speed of the servomotor M.

Figure 2:
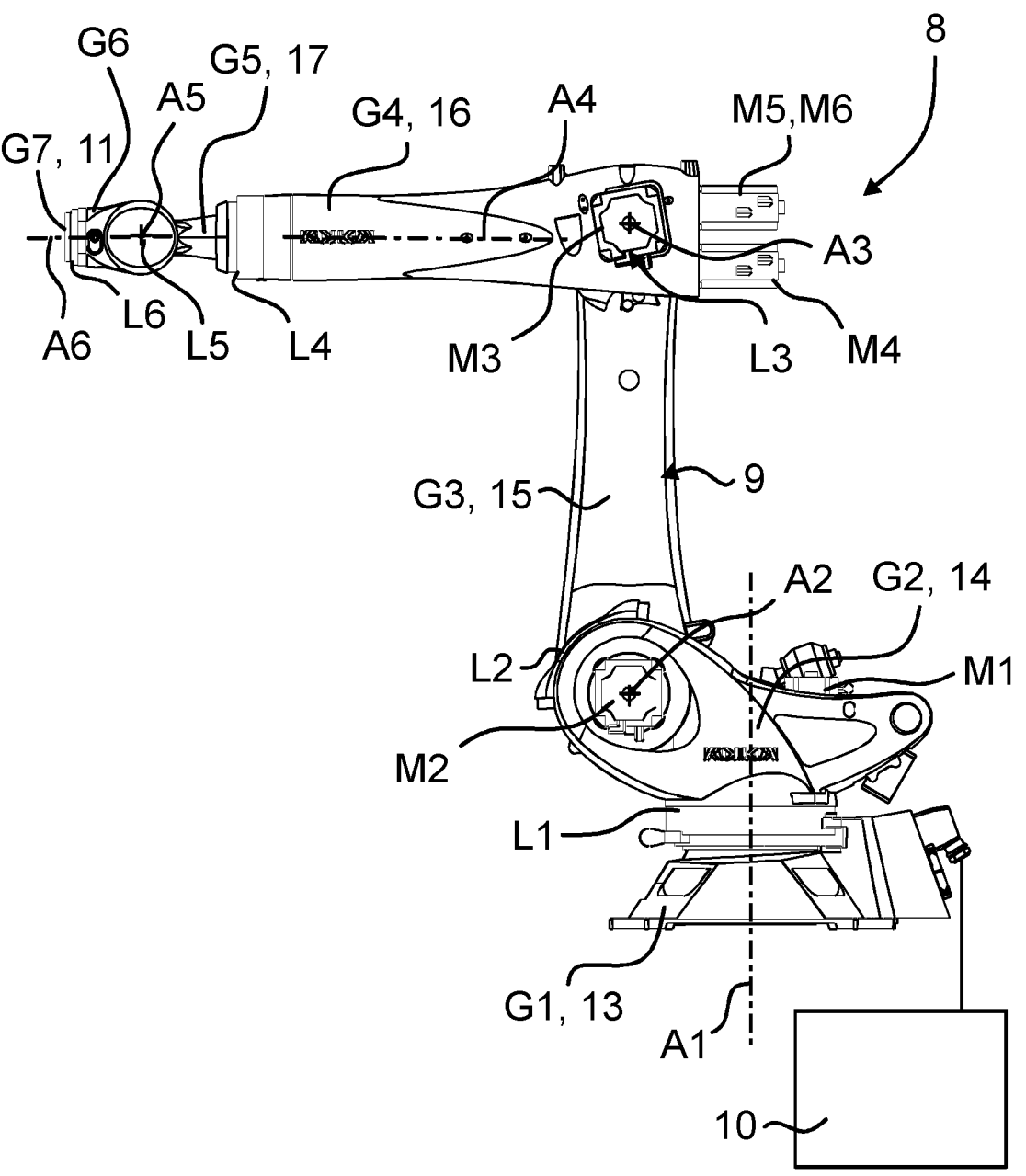
FIG. 2 is a side view of an exemplary industrial robot, which comprises a robot arm with links, joints and servomotors, and which comprises a robot controller which is designed to carry out an inventive method.

FIG. 2 is a depiction of an industrial robot 8 which comprises a robot arm 9 and a robot controller 10. In the case of the present exemplary embodiment, the robot arm 9 comprises a plurality of links G1 to G7 which are arranged one after the other and are rotatably connected to one another by means of joints L1 to L6.

The industrial robot 8 comprises the robot controller 10 which is designed to execute a robot program and to move the links G1-G7 and joints L1-L6 of the robot arm 9 automatically. One of the plurality of links G1-G7 forms an end link (G7) of the robot arm 9, which comprises a tool flange 11.

The robot controller 10 of the industrial robot 8 is designed or configured to execute a robot program, by means of which the links L1 to L6 of the robot arm 9 can be automated or automatically adjusted or rotated in a manual mode in accordance with the robot program. For this purpose, the robot controller 10 is connected to controllable electric drives, the servomotors M1 to M6, which are designed to adjust the respective joints L1 to L6 of the robot arm 9.

In the case of the present exemplary embodiment, the links G1 to G7 are a frame 13 and a carousel 14 which is rotatably mounted relative to the frame 13 about a vertically extending axis A1. Further elements of the robot arm 9 are a link arm 15, a boom arm 16 and a preferably multi-axis robot hand 17 with a fastening device designed as a tool flange 11 for fastening a tool. The link arm 15 is mounted at the lower end on the carousel 14, i.e., on the link L2 of the link arm 15, which can also be referred to as the pivot bearing head so as to be pivotable about a preferably horizontal axis of rotation A2.

At the upper end of the link arm 15, the boom arm 16 is again mounted on the first link L3 of the link arm 15 so as to be pivotable about a likewise preferably horizontal axis A3. At its end, the boom arm supports the robot hand 17 with its preferably three axes of rotation A4, A5, A6. The links L1 to L6 can each be driven by a robot controller 10 in a program-controlled manner by one of the electrical servomotors M1 to M6. For this purpose, an inventive frequency converter 1, as shown in FIGS. 3 and 4, is assigned to the servomotors M1 to M6.

The frequency converter 1, as shown in FIGS. 3 and 4, can be connected to an electric alternating-voltage network 2. The electric alternating-voltage network 2 can be a three-phase alternating-voltage network, for example of 50 Hertz. In particular, it can be configured as a TN system.

If the frequency converter 1 is connected to the alternating voltage network 2, its rectifier circuit 3 can convert the alternating voltage fed from the electric alternating-voltage network 2 into a corresponding direct voltage. The direct voltage is then fed to a direct-voltage intermediate circuit 4. The direct-voltage intermediate circuit 4 is provided with an intermediate-circuit capacitor 5 and with a brake resistor 6 which can be connected and disconnected via a brake chopper S7 of the direct-voltage intermediate circuit 4.

At least one inverter circuit 7 fed from the direct-voltage intermediate circuit 4 and having controllable semiconductor switches S1 to S6 is connected to the direct-voltage intermediate circuit 4.

In the case of the exemplary embodiment in FIG. 3, only a single inverter circuit 7 is connected to the direct-voltage intermediate circuit 4. This single inverter circuit 7 powers the single servomotor M shown in FIG. 3.

In the case of the exemplary embodiment in FIG. 4, a plurality of inverter circuits 7 are connected to the direct-voltage intermediate circuit 4. The plurality of inverter circuits 7 each supply one of a plurality of servomotors M1 to M6 according to FIG. 4. Only two inverter circuits 7 and two servomotors M1 and M2 are shown in full in FIG. 4 for the sake of illustration. The dashed arrows and the designations M3 and M4 indicate a number of further servomotors M3, M4, etc., and further inverter circuits 7, all of which are connected to the common direct-voltage intermediate circuit 4.

In the case of the exemplary industrial robot 8 shown in FIG. 2, for example, a total of six inverter circuits 7 can be provided for the six servomotors M1 to M6 of the six joints L1 to L6 of the robot arm 9.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A method for controlling at least one servomotor in a braking manner using a frequency converter which comprises a rectifier circuit connectable to an electric alternating-voltage network, a direct-voltage intermediate circuit, which is fed from the electric alternating-voltage network in the state connected to the electric alternating-voltage network and has an intermediate-circuit capacitor and a brake resistor, which can be connected and disconnected via a brake chopper of the direct-voltage intermediate circuit, and at least one inverter circuit, which is fed from the direct-voltage intermediate circuit and has controllable semiconductor switches, the method comprising:

disconnecting the direct-voltage intermediate circuit from the electric alternating-voltage network;

braking the at least one servomotor by controlling the semiconductor switches of the inverter circuit in a regenerative braking mode in order to reduce the speed of the servomotor;

controlling the brake chopper in such a way that the brake resistor is switched on at a maximum intermediate-circuit voltage, which forms a switch-on threshold for the brake chopper, and the brake resistor is disconnected at a minimum intermediate-circuit voltage, which forms a switch-off threshold for the brake chopper; and dynamically changing at least one of the switch-on threshold or the switch-off threshold during regenerative braking of the servomotor as a function of the current speed of the servomotor.

2. The method of claim 1, wherein dynamically changing at least one of the switch-on threshold or the switch-off threshold comprises changing the switch-on threshold and/or the switch-off threshold such that the intermediate-circuit voltage is continuously reduced as the speed of the servomotor decreases.

3. The method of claim 2, further comprising reducing the intermediate-circuit voltage in proportion to the decrease in the speed of the servomotor.

4. The method of claim 1, wherein dynamically changing at least one of the switch-on threshold or the switch-off threshold comprises changing the switch-on threshold and/or the switch-off threshold on the basis of a current speed of the servomotor measured by a motor position sensor or on the basis of the measured motor voltage of the servomotor currently prevailing in the servomotor.

5. The method of claim 1, wherein dynamically changing at least one of the switch-on threshold or the switch-off threshold comprises lowering the switch-on threshold and/or the switch-off threshold to a predetermined minimum threshold value.

6. The method of claim 5, wherein the switch-off threshold value is lowered to a minimum threshold value which is below the network voltage of the alternating-voltage network.

7. The method of claim 1, wherein dynamically changing at least one of the switch-on threshold or the switch-off threshold comprises lowering the switch-on threshold and/or the switch-off threshold only to a minimum threshold value at which a minimum voltage is present in the direct-voltage intermediate circuit at which regenerative braking of the servomotor is still ensured by controlling the semiconductor switches of the inverter circuit.

8. The method of claim 1, wherein:

controlling at least one servomotor comprises controlling at least two servomotors simultaneously;

the frequency converter comprises a number of inverter circuits corresponding to the number of simultaneously controlled servomotors;

the inverter circuits are connected to the common direct-voltage intermediate circuit of the frequency converter; and dynamically changing at least one of the switch-on threshold or the switch-off threshold comprises dynamically changing the switch-on threshold and/or the switch-off threshold during regenerative braking of one or more of the at least two servomotors as a function of the current speed of the servomotor that is currently inducing the highest intermediate-circuit voltage.

9. The method of claim 1, further comprising:

increasing the electrical energy in the direct-voltage intermediate circuit during the dynamic change in the switch-on threshold and/or the switch-off threshold in those states of the direct-voltage intermediate circuit in which the brake chopper has disconnected the brake resistor, by the intermediate-circuit capacitor being fed exclusively by the energy generated by the at least one servomotor from the inverter circuit.

10. A robot, comprising:

a robot arm comprising a plurality of links connected by a plurality of respective joints for adjustment of the links relative to one another by movements of the joints;

at least one servomotor assigned to a respective joint and designed to adjust the at least one joint, namely via automatic control of the servomotor; and a control device designed to automatically control the at least one servomotor in order to automatically adjust the links of the robot arm in relation to one another by moving the joints in a driven manner;

wherein the control device is designed and configured to control the at least one servomotor according to the method of claim 1.

11. A computer program product for controlling at least one servomotor in a braking manner using a frequency converter which comprises a rectifier circuit connectable to an electric alternating-voltage network, a direct-voltage intermediate circuit, which is fed from the electric alternating-voltage network in the state connected to the electric alternating-voltage network and has an intermediate-circuit capacitor and has a brake resistor, which can be connected and disconnected via a brake chopper of the direct-voltage intermediate circuit, and at least one inverter circuit, which is fed from the direct-voltage intermediate circuit and has controllable semiconductor switches, the computer program product comprising a non-transient, machine-readable storage medium on which a program code is stored, the program code, when executed by a computer, causing the computer to:

disconnect the direct-voltage intermediate circuit from the electric alternating-voltage network;

brake the at least one servomotor by controlling the semiconductor switches of the inverter circuit in a regenerative braking mode in order to reduce the speed of the servomotor;

control the brake chopper in such a way that the brake resistor is switched on at a maximum intermediate-circuit voltage, which forms a switch-on threshold for the brake chopper, and the brake resistor is disconnected at a minimum intermediate-circuit voltage, which forms a switch-off threshold for the brake chopper; and dynamically change at least one of the switch-on threshold or the switch-off threshold during regenerative braking of the servomotor as a function of the current speed of the servomotor.

\* \* \* \* \*